(12) United States Patent
Obregon Salorio

(10) Patent No.: US 10,986,952 B2
(45) Date of Patent: Apr. 27, 2021

(54) HAND OPERATED FRUIT SQUEEZER

(71) Applicant: Gerardo Obregon Salorio, Mexico City (MX)

(72) Inventor: Gerardo Obregon Salorio, Mexico City (MX)

(73) Assignee: Gerardo Obregon Salorio, Cuajimalpa (MX)

( * ) Notice: Subject to any disclaimer, the term of this patent is extended or adjusted under 35 U.S.C. 154(b) by 0 days.

(21) Appl. No.: 15/610,864

(22) Filed: Jun. 1, 2017

(65) Prior Publication Data

US 2018/0303266 A1  Oct. 25, 2018

(30) Foreign Application Priority Data

Apr. 20, 2017  (MX) .................. MX/E/2017/028464

(51) Int. Cl.
*A47J 19/02* (2006.01)
*A47J 19/06* (2006.01)

(52) U.S. Cl.
CPC ................ *A47J 19/02* (2013.01); *A47J 19/06* (2013.01)

(58) Field of Classification Search
USPC .......... 99/509, 495, 506; 100/234, 243; 81/3
See application file for complete search history.

(56) References Cited

U.S. PATENT DOCUMENTS

| | | | | | |
|---|---|---|---|---|---|
| 331,236 | A | * | 11/1885 | Herrick | A47J 19/022 100/125 |
| 1,959,615 | A | * | 5/1934 | Derrah | A47J 19/022 100/125 |
| 3,016,075 | A | * | 1/1962 | Mantelet | A47J 19/02 131/246 |
| 4,531,457 | A | * | 7/1985 | Sivaslian | A47J 19/022 100/234 |
| 7,395,753 | B2 | * | 7/2008 | Dorion | A47J 19/06 100/110 |
| D595,545 | S | * | 7/2009 | Gaunaurd | D7/666 |
| 2006/0021519 | A1 | * | 2/2006 | Shen | A47J 19/022 99/501 |
| 2006/0086265 | A1 | * | 4/2006 | Gonzalez | B30B 7/00 100/125 |
| 2015/0245726 | A1 | * | 9/2015 | Henry | A47J 19/022 99/506 |
| 2015/0257571 | A1 | * | 9/2015 | Shen et al. | A47J 19/022 |
| 2017/0332820 | A1 | * | 11/2017 | Daraie | A47J 19/022 |

* cited by examiner

*Primary Examiner* — Nina Bhat

(57) ABSTRACT

A hand operated fruit squeezer includes a first squeezer member having a hand grip portion, a pivot portion, and a substantially rounded receptacle portion having a bottom with apertures; a second squeezer member having a hand grip portion, a pivot portion, and a substantially rounded head portion with a pair of presses that fittingly correspond downward into the receptacle portion of the first squeezer member; and a blade assembly pivotally arranged between the first squeezer member and the second squeezer member to hold a fruit in a position suitable for cutting, and squeezing. The first squeezer member, the second squeezer member, and the blade assembly are pivotally coupled using a pivot means that engages into the pivot portions of the first squeezer member, the second squeezer member, and the blade assembly to make the hand operated fruit squeezer operational.

17 Claims, 7 Drawing Sheets

HAND OPERATED FRUIT SQUEEZER

CROSS REFERENCE TO RELATED APPLICATION

The present application claims the priority benefits of Mexican utility model application no. MX/E/2017/028464, filed on Apr. 20, 2017, which is incorporated herein by reference in its entirety.

TECHNICAL FIELD OF INVENTION

The present application generally relates to a fruit squeezer, and specifically, it relates to a hand operated squeezer for squeezing fruit juice out of the fruit. More particularly, the present invention relates to a hand operated squeezer for squeezing fruit juice out of the citrus fruits, such as lemons or limes.

BACKGROUND

The juice from citrus fruits, such as lemons or limes is very useful and is used as a popular ingredient for sauces, drinks, glazes, marinades, custards, and for salad dressings. The citrus juice is widely utilized by consumers for personal use or by restaurants, and the like facilities. The juice is typically squeezed from sliced pieces of lemon by hand into a bowl or like container or directly over a prepared platter of food. However, squeezing juice from the fruit such as lemon by hand is often difficult, time-consuming and messy and can result in un-squeezed juice remaining in the lemon. In addition, squeezing fruit by hand may cause bacteria, germs and dirt particles to contaminate the juice if hands were not properly cleaned. Further, squeezing the fruit using hand results in fruit pulp and pits also being squeezed from the fruit and falling into the food or beverage which then requires the removal of these elements from the juice.

One of popular conventional hand operated fruit squeezer includes a shallow container, a plurality of apertures formed on the bottom of the shallow container, and a protruding element mounted on the surface of the shallow container for being inserted into a cross-section of the cut fruit. When the fruit is pressed on the protruding element by the applied force, the fruit juice is squeezed out of the fruit. However, since fruits such as oranges and lemons contain the fruit stems that interfere with the process of squeezing the soft and dense fruit pulp. Many a times, the fruit juice cannot be fully squeezed out of the fruit pulps and lots of energy of the user is wasted on applying the force.

Several prior art fruit squeezers have attempted to resolve above discussed issues. However, the prior art fruit squeezers are cumbersome to use, often require two hands to manipulate the squeezer with lot of force, and most importantly they require additional tools, such as knives or blades for slicing the fruits prior to squeezing.

Examples of the prior art lemon squeezers may be seen in U. S. Pat. Pub. No. 20130186289 to Fernando Garcia that discloses a lemon juicer device to juice a half lemon.

U.S. Pat. No. 2,348,304 to C. S. Nudelman et al that discloses a serving and squeezing device for citrus fruits that operates upon the slices of citrus fruits.

U. S. Pat. No. 9,095,169 to Foley et al that discloses a hand operable juicer that requires a half fruit, such as an orange cut in half, and placing and pressing the half fruit on a pulping crown.

Finally, a hand-operated rotary fruit juice extractor may be seen in U. S. Pat. No. 2,443,129 which provides a squeezing and turning device that takes half lemon or orange as input and the device is turned by use of one hand by the user while suitable pressure for squeezing is applied by the user using other hand.

All of these devices involve uses of additional tools, such as the knives or blades for slicing or segmenting the citrus fruits prior to squeezing. Further, many of these are heavy and cumbersome designs to operate.

Inventors have also envisioned the squeezers that may not require additional cutting tools for slicing the citrus fruits prior to squeezing, one of the prior arts related to such hand operated lemon squeezers is MX2013000423 that relates to a manual hand squeezer with a cradle or cup part that holds the lemon or citrus fruit and the cradle part consists of an integrated knife for slicing the lemon in one movement when the user actuates the lever containing a crusher that correspond to the cradle or the cup; Another, existing prior art U. S. Pat. No. 1,762,031 by James H Roberts discloses about a squeezer that simultaneously cuts and squeezes fruits to eliminate usual necessity of cutting the fruit into halves prior to squeezing of the fruits. As disclosed in the patent, the device includes two hinged handle members, a top handle member that includes a rounded semicircular spaced parallel plunger member, and a down handle member with a cup-shaped receptacle provided immediately underneath the plunger member. The bottom of the receptacle is reticulated with a blade fitted within the receptacle.

The devices presented in MX2013000423 and U. S. Pat. No. 1,762,031 do tend to eliminate necessity of additional tools for cutting or slicing the lemon or the like fruit prior to squeezing as cutting feature is embedded in the squeezer itself, however, such devices are unsafe for regular cleaning and for regular operation. For example, it is likely possible that when the user cleans the inner bowl or receptacle containing remains of squeezed lemons or like fruits, their fingers might come in contact with sharp edges of the blades fixedly mounted inside the interior cavity of the cup-shaped receptacle holding the remains of squeezed lemons. This is also true when washing the device, since cleaning the interior receptacle might be unsafe without the ability to get the blade out of the way. Further, such proposed solutions are restrictive in their applications, for example, sometimes the fruit sizes can vary and at such instances the proposed solutions fail to properly function.

Additionally, many times, the users of the citrus juicers may need to grate skin of lemons or the like fruits as skin of such fruits contain aromatic substances and vitamin components, especially during drink preparation. However, at times, graters or rinders suitable for use are not readily available when the users need them.

Thus, in the light of the above-mentioned background art, it is evident that, there is a need for an ergonomic hand operated fruit squeezer that would facilitate the users to more comfortably and rapidly cut and squeeze the citrus fruits in one motion, without the need for additional cutting tools. Next, the present invention is directed towards the hand operated fruit squeezer that helps mitigate any risk associated with cleanliness of the squeezers. Next, the objective of the present invention is to provide the fruit squeezer that has an ergonomic design that can help user to operate the device with lesser efforts by applying pressure using one hand. Next, the objective of the present invention is to provide the hand operated squeezer that may be suitable for varying sizes of the lemon or the like fruit.

BRIEF SUMMARY

Before the present systems and methods, enablement are described, it is to be understood that this application is not limited to the particular systems, and methodologies described, as there can be multiple possible embodiments which are not expressly illustrated in the present disclosures. It is also to be understood that the terminology used in the description is for the purpose of describing the particular versions or embodiments only, and is not intended to limit the scope of the present application.

According to an aspect of the present invention there is provided a hand operated fruit squeezer (100). The hand operated fruit squeezer (100) comprises a first squeezer member (102), the first squeezer member (102) having a hand grip portion (104), a pivot portion (106), and a substantially rounded receptacle portion (108) having a bottom with a plurality of apertures (110); a second squeezer member (116), the second squeezer member (116) having a hand grip portion (118), a pivot portion (120), and a substantially rounded head portion (122) with a pair of presses (124) that fittingly correspond downward into the receptacle portion (108) of the first squeezer member (102), wherein the pair of presses (124) are spaced apart and define a channel (126) there between; and a blade assembly (130) pivotally arranged between the first squeezer member (102) and the second squeezer member (116) to hold a fruit in a position suitable for cutting, and squeezing, the blade assembly (130) having an outer edge (132) corresponding to the shape of the receptacle portion (108) of the first squeezer member (102), the head portion (122) of the second squeezer member, a cutting blade (134) centrally arranged within the outer edge (132) in an end to end relation, and a pivot portion (138); and wherein the first squeezer member (102), the second squeezer member (116), and the blade assembly (130) are pivotally coupled using a pivot means (140) that engages into the pivot portions (106,120,138) of the first squeezer member (102), the second squeezer member (116), and the blade assembly (130) to make the hand operated fruit squeezer (100) operational for cutting and squeezing the fruit.

According to the same aspect of the present invention, the hand operated fruit squeezer (100) is provided with a grating element (142) for removing rinds from the fruit.

Additional objects and aspects of the present invention would appear and become clear as the detail description proceeds with the accompanying drawings.

BRIEF DESCRIPTION OF THE DRAWINGS

The foregoing summary, as well as the following detailed description of preferred embodiments, is better understood when read in conjunction with the appended drawings. There is shown in the drawings example embodiments, however, the application is not limited to the specific system and method disclosed in the drawings.

DETAILED DESCRIPTION

Some embodiments, illustrating its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any methods, and systems similar or equivalent to those described herein can be used in the practice or testing of embodiments, the preferred methods, and systems are now described. The disclosed embodiments are merely exemplary.

The various features and embodiments of a hand operated squeezer for squeezing fruit juice out of the citrus fruits, such as lemons or limes are explained in conjunction with the description of FIGS. 1-7.

Figure 1:
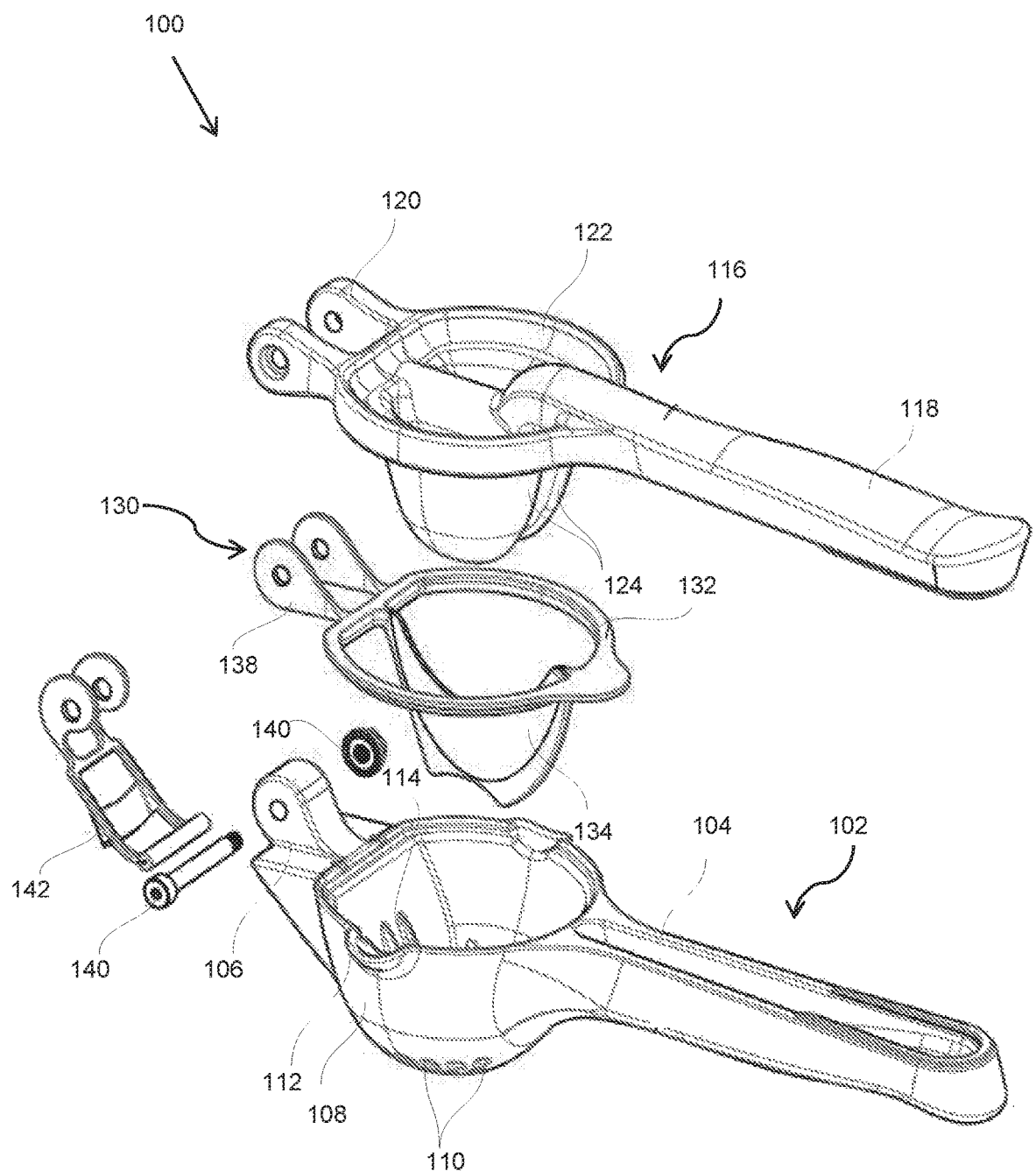
FIG.1 illustrates an exploded view of a hand operated fruit squeezer, in accordance with an exemplary embodiment.

Referring to accompanying FIGS.1-7, particularly to FIG.1 in conjunction with other accompanying FIGS.2-5. As shown, the hand operated squeezer (100) essentially includes a first squeezer member (102), a second squeezer member (116), and a blade assembly (130) pivotally arranged between the first squeezer member (102) and the second squeezer member (116).

Figure 2A:
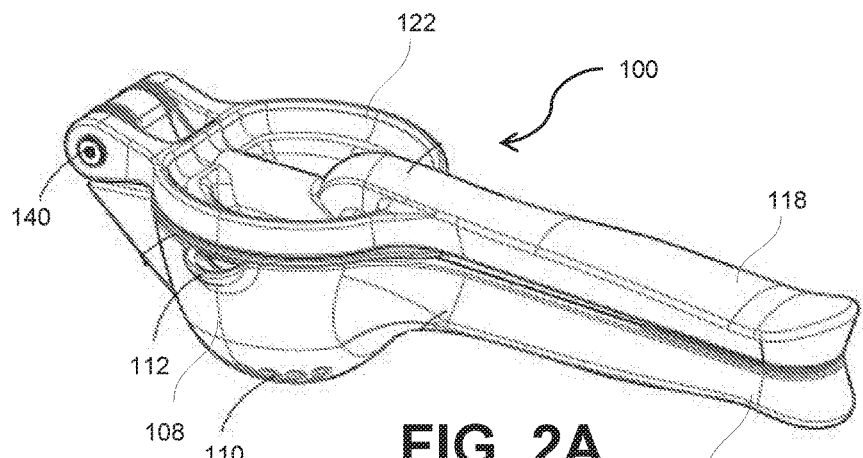
FIG.2A-2C illustrates an assembled perspective view, a side view and a front view of the hand operated fruit squeezer of FIG.1 respectively, in closed position, in accordance with an exemplary embodiment.
Figure 2B:
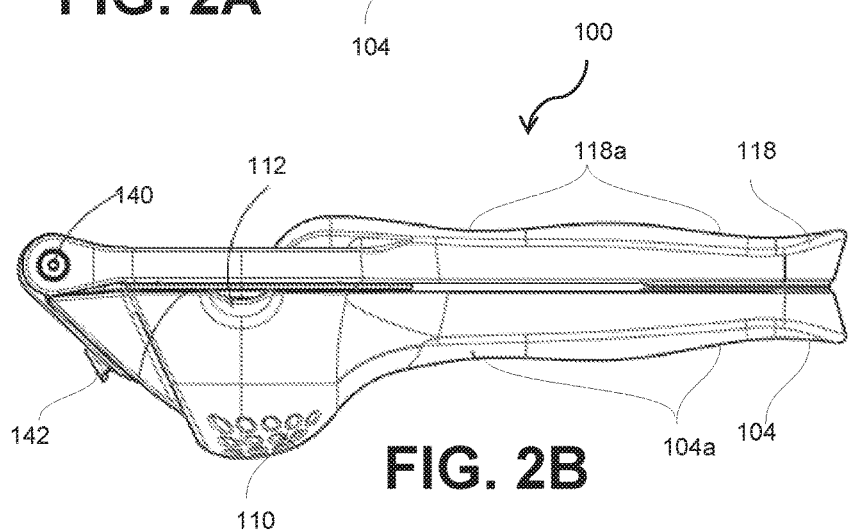
Figure 2C:
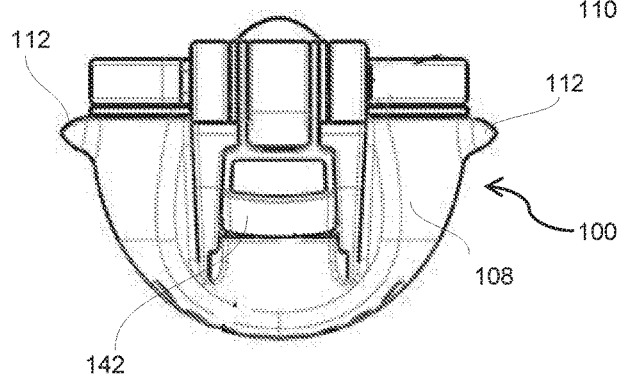

The first squeezer member (102) comprises of a hand grip portion or a handle (104). The hand grip portion (104) is ergonomically shaped preferably curved at one or more areas (104a) throughout its body in order to adapt to the ergonomics of a human hand to facilitate effortless operation of the squeezer (100) as best shown in FIG.2B.

The first squeezer member (102) further includes a pivot portion (106), and a receptacle portion (108) with a bottom. The receptacle portion (108) of the first squeezer member (102) is substantially round in shape just like a cup or a small bowl, for example. The receptacle portion (108) includes a plurality of apertures (110) positioned at its bottom region preferably in a circular orientation. The apertures (110) are sufficiently sized to restrict movement of fruit pulp and pits or seeds outside through the apertures (110) generated when the lemon or lime is sliced and squeezed using the squeezer (100). In other words, the apertures (110) are made sufficiently sized to allow only juice generated from the fruit using the squeezer (100) to run through the apertures (110) and restrict movement of any pulp and pits therefrom.

Figures 5A, 5B:
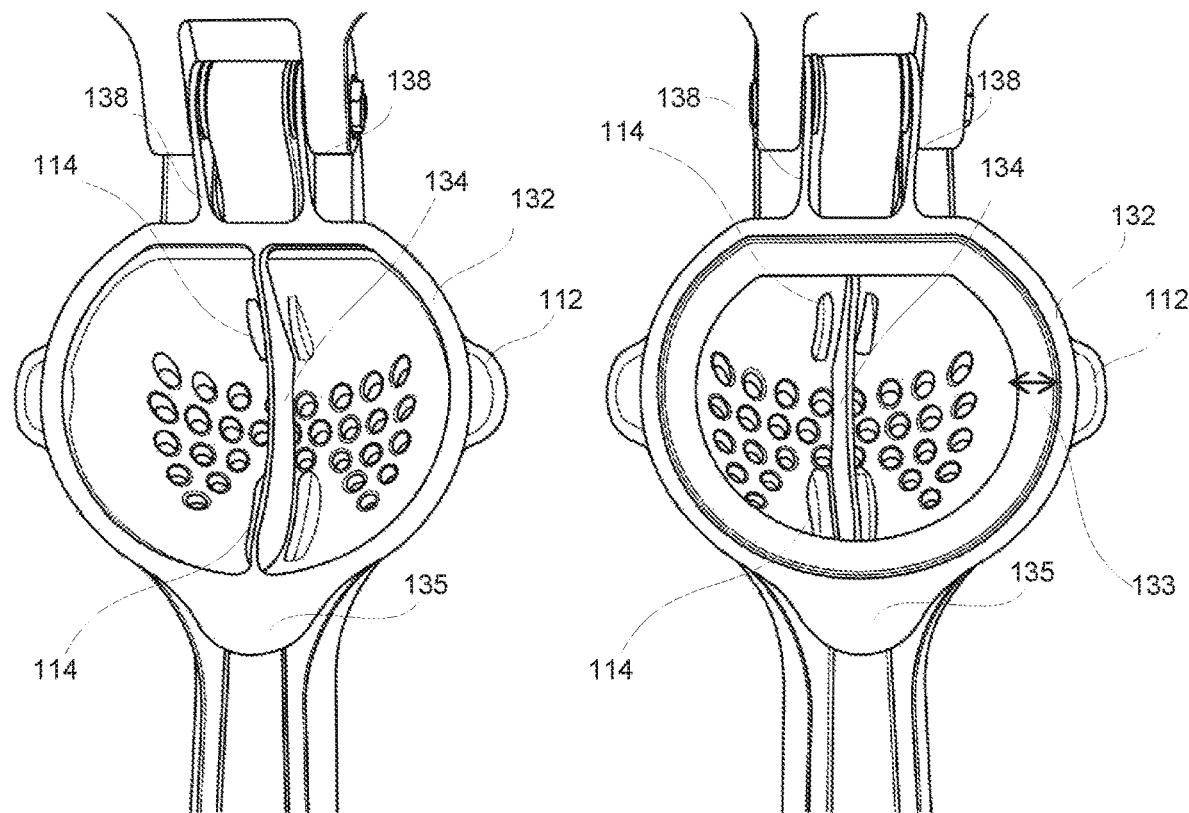
FIG. 5A illustrates a blade assembly as used in the hand operated fruit squeezer of FIG.1, in accordance with an exemplary embodiment.
FIG. 5B illustrates a blade assembly as used in the hand operated fruit squeezer of FIG.1, in accordance with another exemplary embodiment.

Further, referring to FIG.1 and FIGS.5A-5B, the receptacle portion (108) contain a pair of channels (114) configured within an interior side wall of the receptacle portion (108) for directing a cutting blade (134) of a blade assembly (130) within the receptacle portion (108). The receptacle portion (108) further includes at least one mouthpiece (112) configured thereon for directing the squeezed juice out of the receptacle portion (108) in a controlled manner. As shown in accompanying illustrations, the squeezer (100) may comprise of a pair of mouthpieces (112), configured one onto right hand side, and left hand side of the receptacle portion (108) so that the user can pour the squeezed juice into a separate container (not shown) in a controlled manner. The presence of the mouthpieces (112) on the right hand side, and the left hand side provides convenience to both left handed users and right handed users of the squeezer (100).

Referring again to FIG.1 in conjunction with other accompanying FIGS.2-5, the second squeezer member (116) of the hand operated squeezer (100) has a hand grip portion or a handle (118). The hand grip portion or handle (118) is ergonomically shaped preferably curved at one or more areas (118a) throughout its body in order to adapt to the ergonomics of the human hand to facilitate effortless operation of the squeezer (100) as best shown in FIG.2B.

Figure 3:
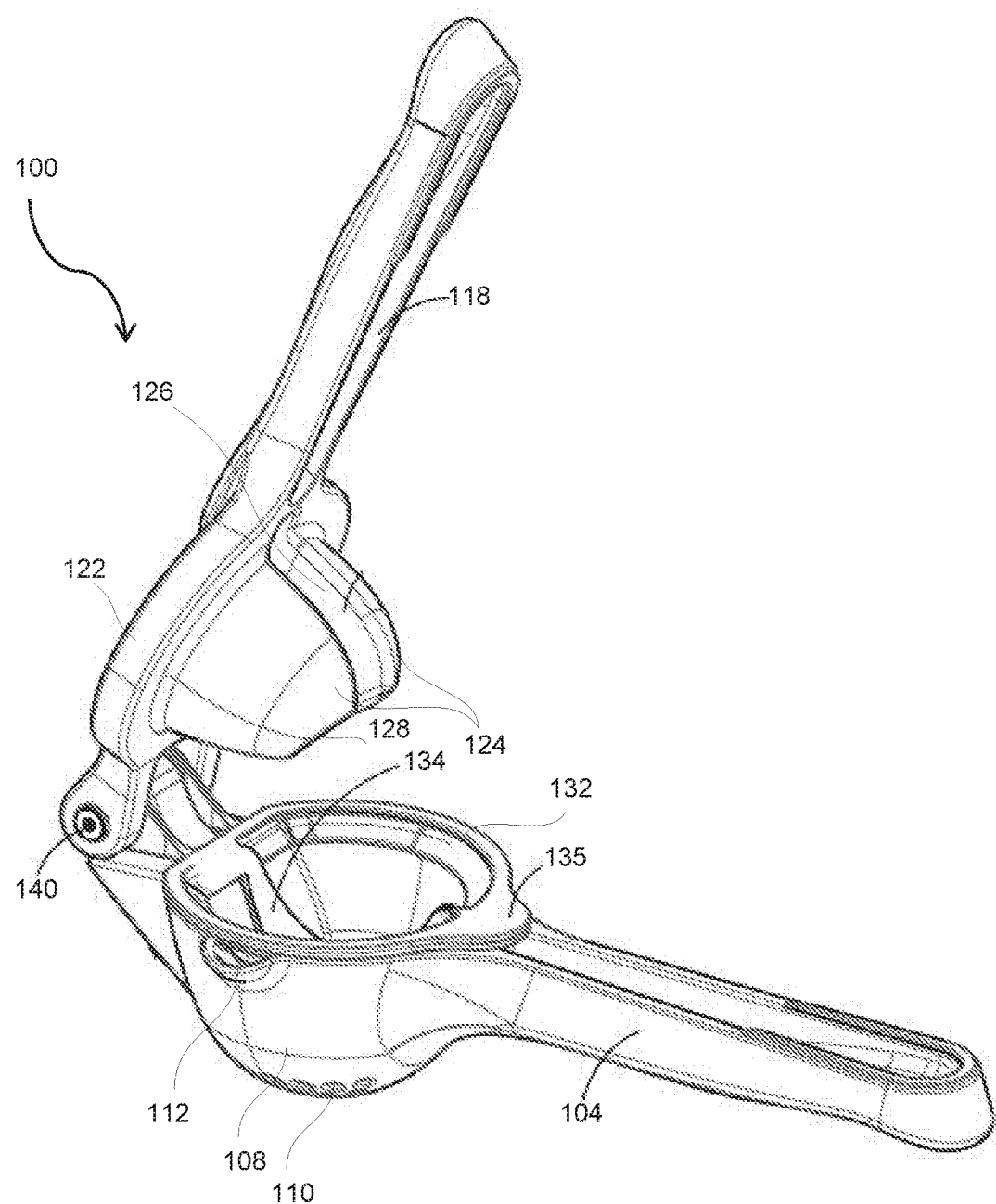
FIG. 3 illustrates an assembled perspective view of the hand operated fruit squeezer of FIG.1, in opened position, in accordance with an exemplary embodiment.
Figure 4:
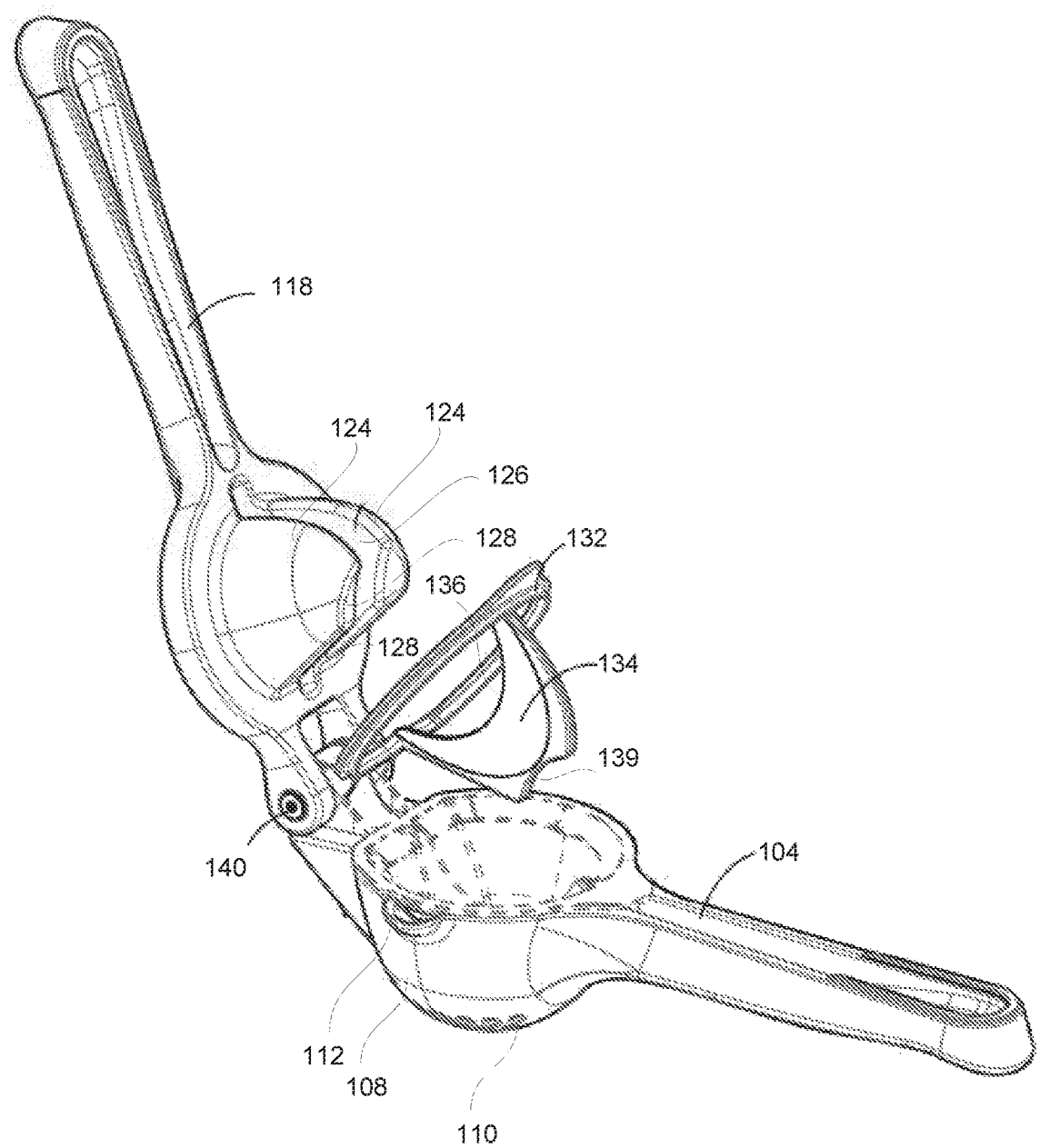
FIG. 4 illustrates another assembled perspective view of the hand operated fruit squeezer of FIG.1, in opened position, in accordance with an exemplary embodiment.

The second squeezer member (116) further includes a pivot portion (120) and a head portion (122) with a pair of presses (124). The head portion (122) is substantially round in shape that corresponds to the shape of the receptacle portion (108) of the first squeezer member (102). According to the preferred embodiment, the head portion (122) of the second squeezer member (116) is made of same size or slightly smaller than the receptacle portion (108) of the first squeezer member (102). The pair of presses (124) is configured onto the head portion (122). The presses (124) fittingly correspond into the receptacle portion (108) of the first squeezer member (102). The pair of presses (124) is spaced apart and defines a channel (126) between them, as best shown in FIGS.3-4. As shown, each of the presses (124) is hemispherically-shaped and rested on rounded interior surface of the head portion (122) with a hollow interior surface accessible from top of the head portion (122). The hemispherically-shaped presses (124) include at least one concave profile area (128), as shown in FIGS.3-4. The concave profile area (128) are preferably defined onto top of the presses (124) and/or onto the sides that engages with the citrus fruit such as lemons or limes during operation of the squeezer (100) to plunge the fruit through the blade assembly (130) for cutting and squeezing the fruit all in one movement.

Referring again to FIG.1 in conjunction with other accompanying FIGS.2-5, the squeezer (100) further includes the blade assembly (130) pivotally arranged between the first squeezer member (102) and the second squeezer member (116) and holds the fruit in a suitable position for cutting, and squeezing or facilitate in operation of squeezer (100). The blade assembly (130) includes a rim or an outer edge (132) corresponding to the shape of the receptacle portion (108) of the first squeezer member (102), and the head portion (122) of the second squeezer member (116). The squeezer (100) of the present invention is capable of embodying removably attachable blade assembly (130) that is pivotally configured onto the squeezer (100) and is able to make partial rotational movement. According to the embodiment, the blade assembly (130) may include the rim or outer edge (132) that may vary in its width to accommodate varying sizes of the citrus fruit preferably lemons or limes. The outer edge (132) may be configured to have a lifting part (135) in the front using which a user can easily lift or move and rotate the blade assembly (130) when the user is required to position the lime inside the blade assembly (130) or is required to clean the squeezer (100). As shown in FIGS.5A, the width of the rim or the outer edge (132) is substantially standard similar to the thickness of the receptacle portion (108) of the squeezer (100). This standard width would help in holding or placement of lemons or limes relatively bigger in sizes. Referring to FIG.5B, the width of the rim or the outer edge (132) is shown widened by a certain distance (133), such widened width of the outer edge (132) ensures accommodation of small sizes of the lemons or limes or like citrus fruits.

According to the embodiment, the blade assembly (130) further includes a cutting blade (134) centrally arranged within the outer edge (132) in an end to end relation. The cutting blade (134) may be fixedly attached using suitable mechanism such as welding. The cutting blade (134) of the blade assembly (130) is concavely curved at its sharpened end (136) engaging the lemon or lime, and concavely curved at an opposed end (139) present in proximity to the bottom of the receptacle portion (108). The concavely curved opposed end (139) of the cutting blade (134) allows free flow of the juice between two cut citrus hemispheres to quickly run out through the apertures (110).

The blade assembly (130) may further have a pivot portion (136) fixedly attached onto the outer edge (132) that helps the assembly (130) achieve pivotal/swingable movement about the pivotal axis. According to the embodiment, the blade assembly (130) may be made of stainless steel or any other suitable materials. According to the embodiment, the first squeezer member (102), the second squeezer member (116), and the blade assembly (130) are pivotally coupled using a pivot means (140) that engages into the pivot portions (106,120,138) of the first squeezer member (102), the second squeezer member (116), and the blade assembly (130) through the holes provided thereon to make the squeezer (100) operational for cutting and squeezing the fruit. The pivot means (140) preferably includes but not limited to screws, lock nuts. The pivotal means (140) may be made of any suitable material such as for example, stainless steel.

Referring further to FIG.1 in conjunction with other accompanying FIGS.2-5, the squeezer (100) further comprises a grating element (142) for removing rinds from the citrus fruit such as lemons or limes. As shown in accompanying illustrations, the grating element (142) is fixedly configured onto the pivot portion (106) of the first squeezer member (102) using the pivot means (140). The pivot means (140) preferably includes but not limited to screws, lock nuts. The combined grating element (142) with the squeezer (100) helps the users grate skin of lemons or the like fruits that contain aromatic substances, vitamin components that may be needed especially during drink preparation. The combined squeezer and grater (100) eliminate necessity of any separate graters or rinders for peeling off the skin of lemons or the like fruits. According to the embodiment, the grating element (142) may be made of stainless steel or any other suitable materials.

Figure 6A:
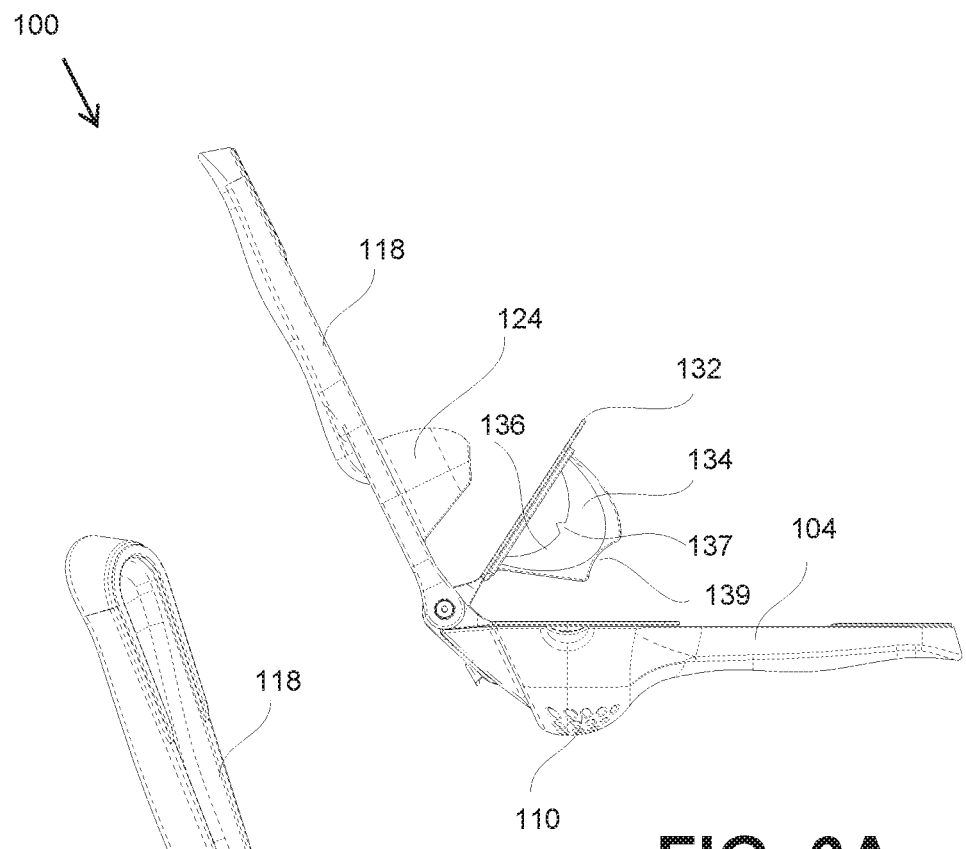
FIG.6A-6B illustrates a side view, and a perspective view of the hand operated fruit squeezer respectively with an alternative blade assembly, in accordance with another exemplary embodiment.
Figure 6B:
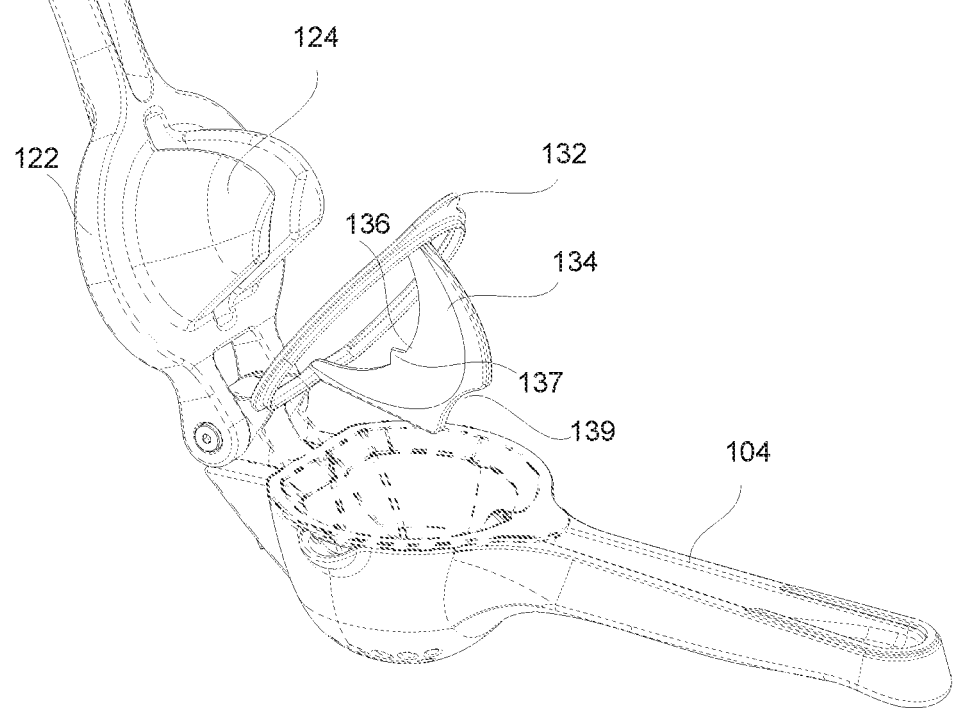

Referring to FIGS. 6A-6B, the squeezer (100) as illustrated is essentially identical to the squeezer (100) illustrated in FIGS.1-5 and therefore all of the like components are similar in their functionalities, however, as shown, the blade assembly (130), more specifically the cutting blade (134) centrally arranged within the outer edge (132) of the blade assembly (130) is shown to have an alternative arrangement. As shown in FIGS. 6A-6B, the concavely curved sharpened end (136) of the cutting blade (134) comprises at least one spike (137) extending upward there-from so that the lemon or the lime can go through it, and remain in desired position or fixed for better cutting and squeezing operation. The spike (137) configured onto the sharpened end (136) of the cutting blade (134) holds the lemon or lime in a fixed position and doesn't let the lemon or lime to move onto the right or left side during the operation of the squeezer (100).

Figure 7:
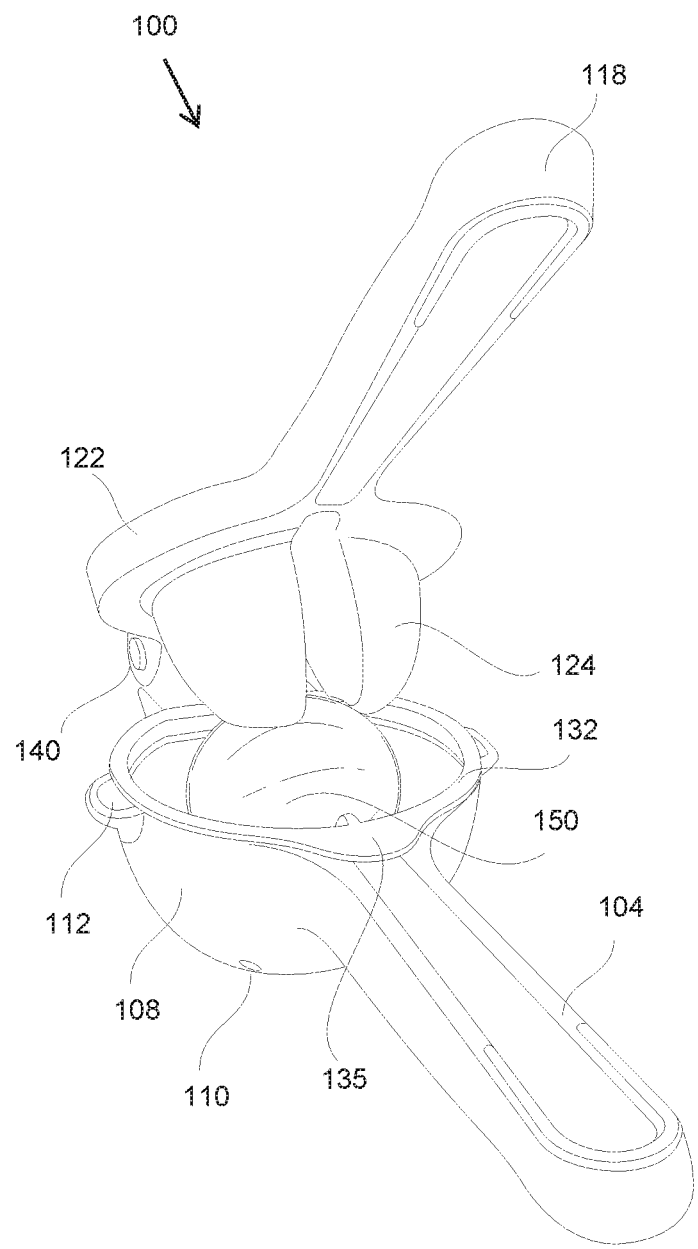
FIG.7 illustrates the hand operated fruit squeezer of FIG.1 in operation, in accordance with another exemplary embodiment.

Referring to FIG. 7 that shows the squeezer (100) of FIGS. 1-6, in operation. In operation, the user starts with initially holding the squeezer (100) using his one or two hands. The user then opens the squeezer (100) by lifting the squeezer member (116) using the lifting part (135) as best shown in FIG.3. Further, as shown, the user then places or positions the lime or lemon (150) on the blade assembly (130) over the centrally located cutting blade (134) and pulls down or reverses the squeezer member (116) to meet the squeezer member (102) in order to close the squeezer (100) using the lifting part (135).

Obviously, the squeezer member (116) is unable to completely meet the squeezer member (102) due to the lime (150) held there between. In this situation, the presses (124) touches the top of the lime (150), specifically the top of the lime (150) engages the curved profile (128) of the presses (124). The curved profile (128) of the presses (124) provides larger surface area of the presses (124) to be in contact with the lemon (150) that helps in better cutting and squeezing of the lemon (150) with less effort.

Next, when the presses (124) are in contact with the lime (150), the user securely holds the hand grip portions (104, 118) of the squeezer (100) preferably using his one hand and applies force onto the hand grip portions (104,118) to plunge the lime (150) through the sharpened end (136) of the cutting blade (134). As the force is applied onto the hand grip portions (104,118) to drive the lime (150) through the sharpened end (136) of the cutting blade (136), the lime (150) gets cut or sliced into to halves preferably into two hemispherical pieces. Further, the presses (124) squeeze the two hemispherical pieces of the lime (150) against the bottom of the receptacle portion (108) to produce lime juice which then flows through the apertures (110) present onto the bottom of the receptacle portion (108). Likely, along with the juice the pulp and pits from the lime (150) may also try to flow through the apertures (110), however, the apertures (110) are sufficiently sized to allow only juice to flow through the apertures and restrict movement of the pits and pulps. Further, if the user desires, the user can pour the juice in controlled manner from the receptacle portion (108) onto the external container by means of the mouthpieces (112) configured thereon.

According to the embodiment, the squeezer (100) specifically the first squeezer member (102), the second squeezer member (116) and all the associated components configured thereon may be made of plastic material, preferably but not limited to thermoplastic material or be made of metals such as cast aluminum or any other suitable materials, or using any suitable combination thereof. Further, it is envisioned that the sizes of the components forming the invention such as the hand grip portions, the head portion, or the receptacle portion can vary based on the design requirements.

In the foregoing description, certain terms have been used for brevity, clearness, and understanding. No unnecessary limitations are to be implied there from beyond the requirement of the prior art because such terms are used for descriptive purposes and are intended to be broadly construed. Therefore, the disclosure is not limited to the specific details, the representative embodiments, and illustrative examples shown and described. Thus, this application is intended to embrace alterations, modifications, and variations that fall within the scope of the current disclosure

I claim:

1. A hand operated fruit squeezer, comprising:
   a first squeezer member, the first squeezer member having a hand grip portion, a pivot portion, and a substantially rounded receptacle portion having a bottom with a plurality of apertures;
   a second squeezer member, the second squeezer member having a hand grip portion, a pivot portion, and a substantially rounded head portion with a pair of presses that fittingly correspond downward into the receptacle portion of the first squeezer member wherein the pair of presses are spaced apart and define a channel there between; and
   a blade assembly pivotally arranged between the first squeezer member and the second squeezer member to hold a fruit in a position suitable for cutting, and squeezing, the blade assembly having an outer edge corresponding to the shape of the receptacle portion of the first squeezer member, the head portion of the second squeezer member, a cutting blade centrally arranged within the outer edge in an end to end relation, and a pivot portion;
   wherein the first squeezer member, the second squeezer member, and the blade assembly are pivotally coupled using a pivot means that engages into the pivot portions of the first squeezer member, the second squeezer member, and the blade assembly to make the hand operated fruit squeezer operational for cutting and squeezing the fruit.

2. The hand operated fruit squeezer of claim 1, wherein each of the pair of presses is hemispherically-shaped and rested on rounded interior surface of the head portion with a hollow interior surface accessible from top of the head portion.

3. The hand operated fruit squeezer of claim 1, wherein the hemispherically-shaped presses includes at least one concave profile area.

4. The hand operated fruit squeezer of claim 3, wherein the at least one concave profile area engages with the fruit during operation of the hand operated fruit squeezer to plunge the fruit through the blade assembly for cutting and squeezing simultaneously.

5. The hand operated fruit squeezer of claim 1, wherein the head portion of the second squeezer member is similarly sized or is slightly smaller than the receptacle portion of the first squeezer member.

6. The hand operated fruit squeezer of claim 1, wherein the plurality of apertures are positioned at the bottom of the receptacle portion in a circular orientation.

7. The hand operated fruit squeezer of claim 6, wherein the plurality of apertures are sufficiently sized to restrict movement of fruit pulp and pits there through generated from the hand operated fruit squeezer upon cutting and squeezing the fruit.

8. The hand operated fruit squeezer of claim 6, wherein the plurality of apertures are sufficiently sized to allow juice generated from the hand operated fruit squeezer to run there through.

9. The hand operated fruit squeezer of claim 1, wherein the cutting blade of the blade assembly is concavely curved at a sharpened end engaging the fruit, and at an opposed end present in proximity to the bottom of the receptacle portion.

10. The hand operated fruit squeezer of claim 9, wherein the concavely curved opposed end of the cutting blade allows free flow of the juice between two cut fruit's hemispheres to quickly run out through the plurality of apertures.

11. The hand operated fruit squeezer of claim 9, wherein the concavely curved sharpened end comprises at least one spike extending upward there-from so that the fruit can go through it, and remain in desired position for cutting and squeezing.

12. The hand operated fruit squeezer of claim 1, wherein the outer edge of the blade assembly have a predefined width to accommodate varying sizes of the fruit.

13. The hand operated fruit squeezer of claim 1, wherein the receptacle portion having a pair of channels configured within an interior side wall thereof for directing the cutting blade of the blade assembly within the receptacle portion.

14. The hand operated fruit squeezer of claim 1, wherein the receptacle portion having at least one mouthpiece configured thereon for directing the squeezed juice out of the receptacle portion in a controlled manner.

15. The hand operated fruit squeezer of claim 1, wherein the hand grip portions of the first squeezer member and the second squeezer member, respectively are ergonomically shaped that adapts to the ergonomics of a human hand to facilitate effortless operation.

16. The hand operated fruit squeezer of claim 1 further comprising a grating element for removing rinds from the fruit.

17. The hand operated fruit squeezer of claim 16, wherein the grating element is fixedly configured onto the pivot portion of the first squeezer member using the pivot means.

* * * * *